United States Patent [19]

Mohler et al.

[11] Patent Number: 4,855,354
[45] Date of Patent: Aug. 8, 1989

[54] ALDEHYDE STARCH SATURANT LAMINATING ADHESIVES

[75] Inventors: Paul J. Mohler, Palatine; Thomas A. Romz, Bloomingdale, both of Ill.; Baird E. Lithgow, Redwood City, Calif.

[73] Assignee: Borden, Inc., Columbus, Ohio

[21] Appl. No.: 141,392

[22] Filed: Jan. 7, 1988

[51] Int. Cl.[4] ............................ C08L 3/02; C09J 3/02; B29J 5/00
[52] U.S. Cl. .................... 525/54.24; 524/49; 156/205; 156/210; 156/328; 156/331.9
[58] Field of Search .................. 524/49; 156/205, 210, 156/328, 331.9; 525/54, 24

[56] References Cited

U.S. PATENT DOCUMENTS

| | | | |
|---|---|---|---|
| 3,293,057 | 12/1966 | Rumberger | 428/530 |
| 3,355,307 | 11/1967 | Schoenberger | 106/213 |
| 3,485,776 | 12/1969 | Bruner et al. | 524/47 |
| 3,487,033 | 12/1969 | McElmary | 524/47 |
| 3,697,355 | 10/1972 | Black | 156/319 |
| 3,905,847 | 9/1975 | Black | 156/622 |
| 3,984,275 | 10/1976 | Hofmann et al. | 156/331 |
| 4,018,959 | 4/1977 | Demko et al. | 428/182 |
| 4,377,649 | 3/1983 | Sweeney et al. | 524/49 |
| 4,379,015 | 4/1983 | Ware et al. | 156/205 |
| 4,396,453 | 8/1983 | Krankkala | 156/328 |
| 4,400,480 | 8/1983 | Silano et al. | 524/47 |
| 4,424,291 | 1/1984 | Leake et al. | 524/47 |
| 4,623,412 | 11/1986 | Bohme et al. | 156/210 |

FOREIGN PATENT DOCUMENTS 057392 11/1979 Japan .

Primary Examiner—Morton Foelak
Assistant Examiner—Nathan M. Nutter
Attorney, Agent, or Firm—Dennis H. Rainear; Kenneth P. Van Wyck

[57] ABSTRACT

The invention relates to a curable aldehyde resin and starch composition useful as a saturant and laminating adhesive for paperboard products, including dual arch corrugated cardboard. The aldehyde resin to starch ratio is from approximately 7:5 to 5:1 by weight. By the present invention is produced corrugated paperboard which has substantially improved crush strength over that obtained with polyvinyl acetate adhesives, and higher moisture resistance than either polyvinyl acetate or starch adhesives.

43 Claims, No Drawings

ALDEHYDE STARCH SATURANT LAMINATING ADHESIVES

BACKGROUND OF THE INVENTION

Starch compositions have been utilized in innumerable and diverse industrial applications, as for example, coatings, sizing agents, adhesives, etc. While such starches, often in derivatized or modified form, have a long history of utility in such applications, there is a continual need to meet broadening industrial demands imposed by new and modified processing means.

Starch based adhesives have been used extensively in the production of corrugated paperboard and corrugated containers. Conventional starch based corrugating adhesives include cooked or gelatinized starch and raw, i.e. unmodified starch particles. A resin, such as a urea formaldehyde, is often added to starch mixtures at low ratios, of approximately 1 part resin to 7 parts starch solids, to provide improved water resistance to paperboard or cardboard. It is known in the art to impregnate cardboard with urea formaldehyde resin to give crush resistance to the cardboard. Generally, however, the urea formaldehyde resin simply penetrates into the cardboard and does not act as an adhesive. The use of starch alone without a resin will provide some adhesive property but no water resistance or crush strength.

"Dual arch" is a term in the art which describes and refers to the laminating of two sheets of paperboard, such as Kraft medium, used in constructing corrugating board. The laminated sheet is then fluted and bonded or glued to two sections of liner board. This process of dual arch lamination increases the crush strength of the corrugated board.

It is known in the art to bond the two sheets of the dual arch mediums to the liner boards with polyvinyl acetate or starch based adhesives. Polyvinyl acetate (PVA) does give some degree of strength but the level of strength improvement is low and, for many applications, inadequate. PVA can also provide some water resistance to the resulting corrugated board however, a major disadvantage of PVA is relative high cost. Starch based adhesives, although lower in cost, will not add substantially to crush strength and have little water resistance.

U.S. Pat. No. 4,623,412 issued on Nov. 18, 1986 to Bohme et al. describes a two step process in which a mixture of urea-formaldehyde, a catalyst and a wetting agent is applied to liner board to impregnate the liner board. In a second step, an aqueous primer, which may be a starch solution, is applied. The primer causes the resin to impregnate the liner board and to leave the surface relatively resin-free.

Bohme et al. also describes a process for impregnating the liner and medium for making corrugated board. Bohme et al. impregnate the board in line with a mixture of urea-formaldehyde resin, wetting agent and a catalyst. After the board is impregnated, the board can be primed with a mixture of water and starch. The board is then dried, remoistened and passed on to a corrugator.

U.S. Pat. No. 3,487,033, issued Dec. 30, 1969 to McElmary and U.S. Pat. No. 4,379,015, issued Apr. 5, 1983 to Ware et al., describe corrugating adhesive compositions made from urea-formaldehyde, starch and water. The McElmary adhesive is formulated of 2 parts to 25 parts of urea-formaldehyde resin to 100 parts of starch solids. Therefore, the ratio of resin solid to starch solids, can be as high as 1:4. The Ware et al. adhesive can be formulated with as much as 1 part of resin solids to 9 parts of starch solids.

U.S. Pat. No. 4,400,480, issued Aug. 23, 1983 to Silano et al., and U.S. Pat. No. 4,424,291, issued Jan. 3, 1984 to Leake et. al., describe corrugating adhesives that comprise resin, starch and water. The Leake et al. adhesive may have a resin solids to starch solids ratio as high as 98:2. The resin must be a resin derived from ethylenically unsaturated carboxylic acids such as acrylic acid and the like. The Silano et al. adhesive may have a resin solids to starch solids ratio as high as 1:10. The resin is a crosslinking additive prepared by reacting acetone and formaldehyde with the further addition of dihydroxyethylene urea.

The Bruner et al. patent U.S. Pat. No. 3,485,776, issued Dec. 23, 1969, describes a modified starch composition useful as a binder for non-woven fabrics. The composition is made by reacting dry granular corn starch and urea-formaldehyde resin in water. The starch swells as it reacts. The proportion of resin to starch falls within the range of 0.6:1 to 2:1 on a weight percent basis.

A Japanese patent, No. JP057392, dated Nov. 5, 1979, issued to Aika Kogyo KK, describes a water resistant adhesive for corrugated cardboard that may be prepared from acetone-formaldehyde resin, urea resin, or urea-melamine resin or melamine resin, and alkali starch paste. The ratio of total resin solids to starch solids can be as high as 40:100 by weight.

The Rumberger patent, U.S. Pat. No. 3,293,057, issued Dec. 20, 1966, describes a modified starch composition comprising starch, urea and polyfunctional aldehyde. However, in Rumberger the aldehyde content does not exceed 20%, by weight, of the composition. The Shoenberger et al. patent, U.S. Pat. No. 3,355,307, describes a corrugating adhesive comprising starch, but which does not utilize an aldehyde resin. Schoenberger et al. describes an ungelatinized starch which is chemically treated so as to act as its own carrier whereby a corrugating adhesive is produced. However, no urea-formaldehyde resin is utilized.

The Black patent, U.S. Pat. No. 3,697,355, issued Oct. 10, 1972, describes a urea-aldehyde resin adhesive used to bond cellulosic particles. The adhesive contains no starch.

The Black patent, U.S. Pat. No. 3,905,847, issued Sept. 16, 1975, describes a urea-aldehyde resin adhesive for bonding wood flakes comprising urea-formaldehyde resin, sodium chloride and magnesium chloride. The adhesive contains no starch.

U.S. Pat. No. 4,018,957, issued Apr. 19, 1977 to Demko et al., teaches the preparation of corrugating adhesive compositions comprising ethylenically unsaturated polymers, ungelatinized starch, a urea-formaldehyde resin, an acid metal salt, and water. Demko et al. requires the presence in the compositions of crosslinkable unsaturated polymers.

Similarly, U.S. Pat. No. 3,984,225, issued Oct. 5, 1976 to Hofmann et al., teaches the preparation of corrugating adhesive compositions comprising starch, PVA, a copolymer of vinylacetate and ethylene and, optionally, a water resistant thermosetting resin such as urea-formaldehyde. The present invention does not require ethylenically unsaturated polymers or PVA or copolymer of vinylacetate and ethylene.

The Krankkala patent, U.S. Pat. No. 4,396,453, issued Aug. 2, 1983, describes a starch-based adhesive which comprises water, starch, a carboxylated styrene-butadiene latex, a crosslinker and thickener. In one embodiment the crosslinker may be a mixture of glyoxal and urea-formaldehyde. However, the crosslinker is present at low levels (0.5 to about 5 weight percent) based upon total weight of the final adhesive.

No art is known to the inventors describing a curable, paper corrugating adhesive made of an aldehyde resin, such as urea-formaldehyde copolymer resin, and starch, a curing agent and water, wherein the adhesive has as high a ratio of resin solids to starch solids as the adhesive of this invention. The highest ratio of urea-formaldehyde resin to starch described in the known corrugating adhesive patent literature was 2:1 (Bruner et al. U.S. Pat. No. 3,485,776). Bruner et al., however, is directed toward binders for non-woven fabrics and not for laminating adhesives or saturants for corrugated paperboard or paper core winding as in the present invention.

No art is known to the inventors that describes an adhesive made specifically for saturating and adhering two plies which form a dual arch corrugated paperboard.

Therefore, it is an advance in the art to provide an aldehyde starch composition which is functional both as a saturant and as a laminating adhesive and which contains a high ratio of resin to starch.

Thus it is an object of the present invention to provide a novel, curable aldehyde resin and starch composition which will act as a paper saturant, provide improved crush strength, provide moisture resistance, and reduce the cost to produce high performance corrugated dual arch paperboard.

SUMMARY OF THE INVENTION

The present invention relates to a curable aldehyde resin and starch composition useful as both a saturant and laminating adhesive for cardboard, paper core winding, paper tube winding, and corrugated cardboard, including dual arch corrugated cardboard. The application to a paper substrate of the composition of the present invention provides upon the addition of or exposure to a curing agent, a unique, curable adhesive which exhibits fast tacking and which will also penetrate the paper substrate. By the present invention is produced a corrugated board which has (1) substantially improved crush strength over that obtained with polyvinyl acetate adhesives, (2) higher moisture resistance than either PVA or starch adhesives, and (3) lower cost than PVA adhesives.

The invention also relates to a process for preparing corrugated paperboard by adhesively bonding a linerboard facing or facings to 2-ply fluted or corrugated paper. The inventors believe that the instant adhesive composition can, in addition to coating and impregnating the substrate, also be applied to the tips of the corrugations of the fluted paper to adhere facings or liner boards pressed onto the tips to thereby form a corrugated composite paperboard. By combining a high level of aldehyde resin and a starch component into an adhesive composition, the inventors believe that the present invention will provide a single step operation to produce a liner adhesive. The instant adhesive compositions exhibit adhesive properties, moisture resistance, and crush strength improvement of laminated paperboard product.

DETAILED DESCRIPTION OF THE INVENTION

The invention relates to a curable adhesive composition applied to at least one to-be-abutted face of two plies of paper that are then abutted. The two-ply paper is then subjected to corrugation by means of exposing the paper to heat and pressure sufficient to cure the adhesive. One or more linerboards are then affixed via adhesives bonding them to the corrugated two ply paper to thereby form a dual arch corrugated paperboard.

The adhesive of this invention is made from modified or unmodified starch, an aldehyde resin possessing low levels of free-formaldehyde, a curing agent and a solvent. A preferred aldehyde resin is urea-formaldehyde. By "low levels of free-formaldehyde" herein is meant levels of formaldehyde less than 1% by weight of the composition, and preferably less than 0.5% by weight. While higher levels of formaldehyde are operative in adhesive compositions of the present invention, such levels are less desirable.

By "aldehyde resin" herein is meant a resin based on the reaction product of mixing an aldehyde, such as formaldehyde or acetaldehyde, with a modifier such as urea, melamine, phenol or a ketone, such as acetone. Thus "aldehyde resin" can include, but is not limited to, resins and copolymer resins such as urea-formaldehyde resins, melamine-formaldehyde resins, phenol-formaldehyde resins, urea-acetaldehyde resins, ketone-formaldehyde resins, and combinations thereof. The aldehyde resin can also be modified with amines, glycols, wetting agents, humectants, surfactants and the like. The aldehyde resin or mixture of resins can be in the liquid resin form or powdered resin form or a combination of liquid and powdered resin forms, with or without supplemental melamine. Thus tertiary systems such as urea-formaldehyde-melamine systems are envisioned within the scope of the present invention. The aldehyde resin can also be an ammoniated or modified resin.

The process for making the adhesive of the present invention comprises mixing cooked starch, uncooked starch or a mixture thereof in a solvent; optioally heating the mixture to for example, 65° C., or to any temperature sufficient to partially solubilize the starch or to at least disperse the starch in the solvent; cooling the mixture to, for example, 50° C. and adding to the mixture starch and an aldehyde resin. A preferred adhesive product comprises approximately 35% (of 100% solids) urea formaldehyde resin; 25% starch and 40% solvent by weight. This equates to a ratio of urea-aldehyde resin solids to starch solids of approximately 7:5. A more preferred adhesive product comprises approximately 45% urea-formaldehyde resin solids, 15% starch and 40% additional water by weight. This equates to a resin to starch ratio of 3:1 by weight. The ratio of aldehyde resin to starch according to the present invention can go to as high as approximately 5:1 by weight. Resin to starch ratios of 6:1 to approximately 9:1 are expected to also be operative in the present invention. However, at extremely low levels of starch, the compositions will cure, but tend to penetrate into the substrate leaving little or none at the surface of the substrate available for adhesion to a second substrate.

Thus, the invention relates to a curable composition of matter useful as an adhesive for paperboard materials which comprises:

(a) a starch-aldehyde resin mixture, said mixture being formed by mixing said starch and said aldehyde resin;

(b) a curing agent capable of reducing the pH of the composition, wherein said curing agent is present in an amount sufficient to accelerate the cure of the composition; and (c) a solvent, such as water or alcohols and water; wherein the ratio of aldehyde resin to starch is from 7:5 to 5:1 by weight.

The inventors believe that acetone-formaldehyde resin will also be operative in the present invention. Most acetone formaldehyde resin systems generally cannot be mixed with urea formaldehyde or melamine formaldehyde resin systems because of the acidity of the acetone formaldehyde resin system. Used as the sole resin component, such acetone-formaldehyde resins, when mixed with starch at a ratio of about 7:5 to about 5:1 by weight, are, however, expected to be operative within the scope of the present invention. Some acetone formaldehyde resin systems have been formulated with a neutral pH and these, if mixed with starch according to the process of the present invention, are also expected to be operative.

Urea-formaldehyde and the other aldehyde resins useful in the present invention are well known. Although urea-formaldehyde resins do not form satisfactory films by themselves, they are of major importance to the coating industry when blended with other materials. The urea-formaldehyde resins and aldehyde resins that contain hydroxyl, carboxyl, or amide groups are also operative in the present invention.

The adhesive composition is curable upon the addition of or exposure to a sufficient amount of a curing agent, such as aluminum chloride, aluminum sulfate, ammonium sulfate, ammonium chloride, maleic acid, maleic anhydride, sodium bisulfate, p-toluene sulfonic acid, formic acid, acetic acid, and the like. By "curing agent" herein is meant any curing agent known in the art as useful for curing aldehyde resins, or agents capable of reducing the pH of the adhesive composition to thereby accelerate the cure of the composition. The curing agent is used in the adhesive to promote the reaction between the components of the adhesive composition. The curing agent also accelerates the polymerization of the aldehyde resin in the composition. The pH at which the adhesive composition cures will vary depending on the reactivity and solubility of the curing agent, the level of curing agent used, and the type of aldehyde resin. The preferred curing agents are aluminum chloride, ammonium sulfate and ammonium chloride. The most preferred curing agent is aluminum chloride. The curing agent is added to the adhesive composition at a level commonly ranging from 0.1 to 10.0 percent by weight of the adhesive composition. A preferred level of curing agent is 0.5 to 3.0 percent by weight of the adhesive composition on a solids basis.

Free formaldehyde present in the resin undergoes the Cannizzaro reaction to produce formic acid. This increased acid content further lowers the pH which accelerates the cure. Therefore, resin with low free formaldehyde content must have the pH reduced by the addition of a pH reducing catalyst.

By "modifed starch" herein is meant starch which has been chemically or physically treated so as to alter its chemical reactivity or physical state. Such modification can include, but is not limited to, chemical treatment with acidic or basic media, esterification, heat, pressure, milling, cooking and the like. Thus, the starch can be pre-cooked or partially cooked to pregelatinize the starch, thereby promoting tack and increasing the viscosity of the adhesive composition.

Various additives can be added to the adhesive compositions of the present invention. The additives can include, for example, varying amounts of PVA emulsion, wax emulsion, silicone fluid, silicone resin, silicone emulsion, acrylic emulsion, SBR, and other resin emulsions. Ethylene acrylic acid is also an acceptable additive in the present invention. Additives are generally useful in promoting faster tack, or better adhesion characteristics to certain substrates, or for improving water resistance. The PVA resin emulsion additives tend to be slightly acidic which thereby act as curing agents and accelerate the cure of the present adhesive compositions. Additional additives can include various silica, silicate and other mineral, carbonaceous, or clay fillers. Finely ground, naturally occurring fillers, such as ground nut shells, will also operate in this invention. Other additives will be obvious to those skilled in the art.

Wax and other additives, such as certain clays, tend to remain substantially on the surface of the coated substrate when the wax or other additives are present in the adhesive compositions of the present invention. This hold-out tendency provides additional water repellency to the coated substrate without impeding the penetration of the aldehyde resin. The addition of wax additives, such as wax emulsions, to aldehyde resins is known in the art, but it is novel to combine aldehyde resin, starch and a wax. Thus the present invention also relates to compositions of matter comprising an aldehyde resin, a starch and a wax, with and without the addition of a cure agent. By "wax" herein is meant any natural wax such as, for example, the higher monohydric alcohol esters of fatty acids, or synthetic wax such a polyethylene or paraffin wax. Wax additives are useful in the present invention to alter the surface energy characteristics of the coated substrate to create desired release, antiblocking, moisture vapor barrier, or slip properties, as well as increasing the hydrophobicity of the coated substrate.

A preferred form of the urea-formaldehyde resin operable in the present invention is available from Borden, Inc.—Chemical Division under the name Casco Resin CR-16. Other aldehyde resins operable in the present invention, include, but are not limited to, Casco Resin CR-576 and Casco Resin CR-5H, available from Borden, Inc.—Chemical Division.

The starch component, which may be the ungelatinized starch or gelatinized carrier starch portion of the adhesive composition of the present invention, may be selected from any of the several starches, native or converted, heretofore emphasized in starch adhesive compositions. Suitable starches include but are not limited to, for example, those starches derived from corn, potato, waxy maize, rice, sago, milo, tapioca, sorghum, wheat, as well as high amylose starches, i.e., starches which contain 30% or more by weight of amylose, and the various derivatives of these starches. Hence, among the applicable starches are included the various starch derivatives such as ethers and esters. Preferred starches include those typically employed in corrugator adhesives including acid and alkaline type adhesives, and chemically modified ungelatinized starch, such as oxidized starch, acid-modified starch, enzyme modified starch and the like.

The invention further relates to a method of preparing an aldehyde resin and starch composition comprising:

(a) mixing starch and a solvent, such as water or an alcohol and water mixture;

(b) heating the starch and solvent mixture to a temperature sufficient to at least partially solubilize or disperse the starch in the solvent; and (c) adding to the starch and solvent mixture the mixture obtained from mixing starch and an aldehyde resin to thereby produce the aldehyde resin and starch composition.

In a modification of the above method, aldehyde resin can be added to the starch and solvent mixture prior to, or in the absence of, the heating of step (b). This introduction of resin can be in addition to the resin added in step (c) after the heating. The heating step is useful, but not required, in solubilizing the starch in the solvent. Complete solubilization or gelatinization of the starch is not necessary according to the present invention. Dispersion of the starch in the solvent is adequate prior to the addition and mixing of the aldehyde resin, since subsequent temperatures during the curing of the adhesive are generally sufficient to achieve adequate solubilization.

According to the present invention, an aldehyde resin, such as urea-formaldehyde, is mixed with modified (e.g., cooked or chemically treated) or unmodified starch or a mixture thereof in a weight ratio ranging from 7;5 to 5:1. The most preferred ratio of urea-formaldehyde resin to starch is 3:1.

The remainder of the adhesive composition comprises from approximately 20 to 50%, by weight, of a solvent such as water, or a mixture of water and organic solvents, such as alcohols. The alcohols can include methanol, ethanol, isopropyl alcohol, and the like, or mixtures thereof. The preferred solvent is water, and the preferred solvent level is approximately 40% by weight.

Thus, a preferred embodient of the adhesive composition of the present invention has 45% urea-formaldehyde resin, 15% starch, and 40% water, by weight. To facilitate a cure of the adhesive composition, a curing agent is also added. The curing agent can be added directly to the adhesive composition or added separately to the paperboard substrate.

In one embodiment of the present invention, the components of the adhesive, including the curing agent, are admixed together to form an adhesive and saturant (impregnating) composition and are applied to at least one of the two plies of paperboard in amounts sufficient to provide from 2 to about 12, preferably from about 4 to about 6 pounds per thousand square feet of paperboard. The process of coating the impregnating adhesive composition onto the substrate may be accomplished under ambient conditions, or at elevated temperatures, using conventional methods and equipment. The adhesive composition partially penetrates the paper acting as a paper saturant, which when cured, provides significant increase in crush strength and moisture resistance of the corrugated board. During application of the adhesive, the starch component of the adhesive composition contributes to a fast tacking feature of the adhesive and also provides a glue line for adhesion of the Kraft medium and/or liner board.

In a paper corrugating line, a paper or paperboard medium is fluted and laminated between two liner boards to produce a single wall corrugate. The adhesive composition of the present invention, with the curing agent added, can be applied to the paper or paperboard material while the paperboard material is on paper corrugating lines, or before, using transfer roll coating techniques, two roll metering, doctor blades, spray coating and other conventional techniques. The two plies, at least one of which has been treated with the instant adhesive, are then corrugated by conventioal techniques which operation provides sufficient heat and pressure to cure or partially cure the adhesive. It is also possible to cure or partially cure the adhesive on the paper prior to the corrugation process by, for example, passing the coated ply over a heated roll or under heat lamps. It is not necessary to completely coat the substrate with the adhesive composition. Adhesion can be achieved by applying the composition in stripes, pattern, or localized spots.

Thus the invention further relates to a method of preparing corrugated paperboard comprising:

(a) preparing an aldehyde resin and starch composition by a process comprising:
 (1) mixing starch and a solvent;
 (2) heating the starch and solvent mixture to a temperature sufficient to disperse, partially solubilize or solubilize the starch in the solvent;
 (3) adding to the starch and solvent mixture the mixture obtained from mixing starch and an aldehyde resin to thereby produce the aldehyde resin and starch composition; and
 (4) adding to the composition or to a paperboard substrate or both a curing agent capable of reducing the pH of the composition, wherein said curing agent is present in an amount sufficient to accelerate the cure of the composition;

(b) applying the composition to at least one surface of the paperboard substrate, wherein the composition coats and impregnates said substrate; and (c) passing the coated and impregnated substrate to a corrugator, wherein the substrate is exposed to temperature and pressure conditions sufficient to cure or partially cure the composition, and whereby the substrate is corrugated.

The heating step in the above process is not required but does assist in solubilizing the starch in the solvent.

To the corrugated medium is then attached via an adhesive at least one liner board, or top and bottom liner boards. The adhesive used to adhere the liner boards can be PVA adhesives, starch adhesives, or other adhesives known in the art. It is expected that the adhesive compositions of the present invention may also prove to be useful in adhering the fluted medium to the liner boards.

The curing agent for the adhesive can be added initially in a diluted or undiluted form to the composition before the adhesive is applied to one or both plies, or the curing agent can be applied by a transfer roller, doctor blade or spray operation to the coated plies before or during the corrugating operation. The curing agent can also be added to the adhesive composition, or added to the substrate prior to the application of the adhesive. In the alternative, the curing agent can be added to the substrate after the adhesive coating is applied. In yet another alternative of the process of the present invention, the curing agent of choice can be mixed with an additive, such as the resin emulsions discussed above, and the mixture added to the adhesive composition before, during or after application of the adhesive composition to the substrate. The curing agent can also be premixed with spray dried aldehyde resin which mixture can then be added to the present adhesive compositions. Thus the present invention also relates to aldehyde resin and starch compositions which do not contain a curing agent but which are subsequently curable upon mixing with or exposure to a curing agent.

The process of the present invention eliminates the need for a two step coating operation as is commonly used in the art of impregnating and saturating substrates with corrugation adhesives. The present invention combines the strength reinforcing step of the resin addition with the glue addition step of the starch addition. The resin is added in the instant invention at a level previously not utilized in corrugating adhesives. Prior art usage of aldehyde resins in corrugating adhesives was directed to attaining moisture resistance achievable at relatively low resin levels.

By the processes of the present invention, compositions useful as adhesives and for impregnating paper and paperboard material are produced. When the compositions are cured on the surface of and within the matrix of the paper or paperboard material, a significant improvement in crush strength of the dual arch corrugated paperboard subsequently produced is obtained. The compositions are particularly useful for impregnating and reinforcing paper core winding and paper tube winding to provide improved strength to the core and tubes. In this manner, lighter weight paper can be used. Additionally, conventional core winding and tube winding operations generally use a sodium silicate-filled or clay-filled PVA emulsion or a homopolymer emulsion or a dextrin adhesive as the adhesive composition. However, the sodium silicate or clay does not substantially penetrate the paper. The compositions of the instant invention will penetrate the core or paper tube stock and, when thermally cured, provide improved strength and improved water resistance. The compositions and processes of the present invention are applicable in both spiral and convolute core winding techniques.

Table I illustrates the increase in crush strength obtained by the present invention, compared to the crush strengths obtained by PVA adhesive and a control without any adhesive.

TABLE I

| | Crush Strength of Corrugated Board | |
|---|---|---|
| | Dry Adhesive Wgt[2]/1000 sq. ft. | |
| Adhesive System[1] | 4 pounds | 6 pounds |
| (a) None | 150[3] | 150 |
| (b) PVA | 180 | 235 |
| (c) UF/Starch (9:5) | 230 | 275 |
| (d) UF/Starch (3:1) | 225 | — |

[1]Applied to two ply 26 pound/1000 square feet Kraft medium paperboard.
[2]Applied by Mayer rod application techniques, followed by a spray application of a 25% aluminum chloride catalyst aqueous solution.
[3]The test values of crush strength reported in pounds were obtained by use of the Concore Fluted Crush Test for Corrugating Medium as prescribed in TAPPI T809, Par. 6.1, 6.1.1, 6.1.2, and Note - 1. Values measured at 70° F., 50% relative humidity.

While the increase in crush strength varies as a function of the paper used, the application techniques, the type of PVA resin, and the cure procedure for the UF/-starch adhesive composition, the relative strength of the adhesive of the present invention is significantly higher than that of the state of the art PVA adhesive. Thus, Table I indicates a 53% (at 4 lbs.) to 83% (at 6 lbs.) increase in crush strength of the instant invention composition over the crush strength of the non-coated medium. Improvements of 33% (at 4 lbs.) and 27% (at 6 lbs.) in crush strength of the present invention over the values for PVA are also noted in Table I. Conventional formulations of laminating and corrugating adhesives with high starch to UF ratios, when used in dual arch applications, exhibit crush strengths well below the values for PVA in Table I.

Table II illustrates that the substitution of cooked starch for some of the uncooked starch did not adversely effect the crush strength of the resulting corrugated board.

TABLE II

| | Substitution of Cooked Starch[1] | | | |
|---|---|---|---|---|
| Adhesive System | Percent Cooked Starch | Crush Strength 4 Lbs. Adhesive /1000 Sq. Ft. | Percent Increase Over No Adhesive | Percent Increase Over PVA |
| UF/Starch (3:1) | 4 | 225 | 86 | 33 |
| UF/Starch (3:1) | 2 | 226 | 87 | 34 |
| UF/Starch (3:1) | 0 | 223 | 84 | 31 |
| PVA | — | 185 | 53 | — |
| No Adhesive | — | 121 | — | — |

[1]Total starch content was 15% by weight of the adhesive composition.

EXPERIMENTAL

The following examples are provided for illustration only and are not to be viewed as limiations of the invention. Those skilled in the art will appreciate the scope of analogous and obvious expansions which are hereby included.

EXAMPLE 1

This example illustrates the preparation of a corrugating adhesive in accordance with this invention.

Uncooked corn starch (20 gms.) obtained from Corn Products Company, Argo, Ill., was stirred for five minutes at 25° C. in 25 gms. of water. To this mixture was added 175 gms. of urea-formaldehyde resin Casco Resin CR-16 and the mixture was heated to 65° C. for 5 minutes to at least partially solubilize the starch. This was labeled Mixture A. Mixture A was then cooled to approximately 50° C. To Mixture A was added with stirring 280 gms. of Mixture B. Mixture B was composed of 105 gms. of starch, 175 gms. of urea-formaldehyde resins Casco Resin CR-16 and was produced by mixing at 25° C. The addition of Mixture B to Mixture A produced Mixture C which was stirred at a temperature of 35° C. for 5 minutes to produce an adhesive composition with a resin to starch ratio of approximately 9:5 at 70% solids in water. This composition was shelf stable with little or no viscosity drift at 25° C. for at least one month.

EXAMPLE 2

This example illustrates the preparation of dual arch corrugated paperboard in accordance with this invention.

The adhesive composition produced by the procedure of Example 1, above, was catalyzed with 10 gms. of aluminum chloride curing agent. The catalyzed adhesive composition was then applied by a transfer roll technique to one side of each of two plies of Kraft medium paperboard (26 lbs/1000 sq. ft.) at an add-on weight basis of 4 lbs of adhesive composition per 1000 sq. ft. of paperboard. The coated paperboard was then passed to a corrugator where the papers were pressed at 50 psi. and 280° F. at form a dual ply medium and then fluted. To the fluted medium was laminated a top and bottom liner board using conventional PVA adhesive, 16-137C, obtained from Borden, Inc.—Chemical Division. By this method was produced a dual arch corrugated paperboard using the instant adhesive composition as the corrugating adhesive.

EXAMPLE 3

This example further illustrates the preparation of dual arch corrugated paperboard in accordance with this invention.

The procedure of Example 2 was followed except that 6 pounds of adhesive composition per 1000 sq. ft. of paperboard were applied. Acceptable, high crush strength, moisture resistant corrugated paperboard was thereby produced.

EXAMPLE 4

This example further illustrates the preparation of corrugated paperboard in accordance with this invention.

The procedure of Example 2 was followed except that the papers were corrugated at a pressure of 50 psi. and at 350° F. Acceptable, high crush strength, moisture resistant corrugated paperboard was thereby produced.

EXAMPLE 5

The uncatalyzed adhesive composition of Example 1 was applied to 2 plies of Kraft paper (26 pounds/1000 sq. ft.) at an add on weight basis of 3 pounds per square feet per ply by a roll coat technique. The curing agent, aluminum chloride, at 25% solids in water, was then applied to the coated paperboards by means of spray. The coated surfaces of the paperboards were abutted and the composite cured by passing the coated paperboards to a corrugator and pressing the composite at 50 psi., and 350° F. for one second. A top and bottom liner board were adhered to the composite by means of the application to the tips of the corrugated medium of a PVA adhesive, 16-137C, obtained from Borden, Inc.—Chemical Division. The fluted medium with the top and bottom liner boards was passed to heating plates whereby the adhesives were set. It should also be possible to substitute the instant adhesive composition for the PVA liner board adhesive used in this Example.

EXAMPLE 6

This example illustrates the preparation of a corrugating adhesive with a resin to starch ratio of 3:1 according to the present invention.

Uncooked corn starch (10 gms.) obtained from Corn Products Company, Argo, Ill., was stirred five minutes at 25° C. in 75 gms. of water. To this mixture was added 175 gms. of urea-formaldehyde Casco Resin CR-16, from Borden, Inc.—Chemical Division, and the mixture heated to 65° C. to at least partially solubilize the starch. This was labeled mixture A. Mixture A was then cooled to approximately 50° C. To Mixture A was added with stirring 240 gms. of Mixture B. Mixture B was composed of 65 gms. of starch and 175 gms. of urea-formaldehyde resin Casco Resin CR-16, from Borden, Inc.—Chemical Division, and was produced by mixing at 25° C. The addition of Mixture B to Mixture A produced Mixture C which was stirred at a temperature of 35° C. for 5 minutes to produce an adhesive composition with a resin to starch ratio of approximately 3:1 at 60% solids in water. This composition was shelf stable with little or no viscosity drift at 25° C. for at least one month.

EXAMPLE 7

This example illustrates the preparation of a corrugating adhesive with a resin to starch ratio of 3:1 without heating according to the present invention.

To 175 gms. of water was added 75 gms. of starch at 25° C. with stirring for 10 minutes. To this mixture was added 350 gms. of urea-formaldehyde resin, Casco Resin CR-16, Borden, Inc.—Chemical Division, and the mixture stirred for 10 minutes. This produced an adhesive composition with a resin to starch ratio of approximately 3:1 at 60% solids in water. This composition was shelf stable with little or no viscosity drift at 25° C. for at least one month.

EXAMPLE 8

The adhesive composition of Example 7 was applied to Kraft paper by the procedure of Example 5, and the curing agent, aluminum chloride, was applied as in Example 5. The papers were corrugated at a pressure of 50 psi. and at 350° F. Acceptable, high crush strength, moisture resistant corrugated paperboard was thereby produced.

EXAMPLE 9

This example demonstrates the necessity of having starch in the adhesive composition.

A UF resin, Casco Resin CR-16, Borden, Inc.—Chemical Division, catalyzed with 2% by weight aqueous aluminum chloride to a pH of 4.0, was applied to 27 lb. medium Kraft by means of a #30 Mayer rod. An uncoated 27 lb. medium Kraft was applied over the coated medium and the composite was exposed to a heat sealer at 350° F. and 20 psi. for varying dwell times of 0.5 second, 1.0 second, 2 seconds or 4 seconds. The composite was then allowed to cool to room temperature and was manually checked for adhesion by pulling the plies apart. Regardless of dwell time in the heat sealer, there was no adhesion of the plies and no fiber tear. The resin, in fact, had penetrated the medium completely and was adhering the paper to the heat sealing bars.

For comparison, a resin/starch adhesive composition with a Casco Resin CR-16 resin to starch ratio of 3:1 with 2% aluminum chloride catalyst added, was applied by a #30 Mayer rod to 27 lb. medium Kraft. An uncoated top ply of 27 lb. Kraft medium was applied and the composite subjected to the heat sealer at 350° F. and 20 psi. for 0.5 seconds, 1 second, 2 seconds and 4 seconds. After 0.5 second dwell time, the composite exhibited approximately 10% fiber tear and 90% adhesive failure. After 1 to 4 seconds, the composite exhibited 100% fiber tear, i.e. the composite failed cohesively rather than adhesively. This example illustrates the necessity of the starch in the instant compositions.

That which is claimed is:
1. A curable composition of matter which consist of:
 (a) a starch-aldehyde resin mixture, said mixture being formed by mixing said starch and said aldehyde resin;
 (b) a curing agent capable of reducing the pH of the composition, wehrein said curing agent is present in an amount sufficient to accelerate the cure of the composition;

(c) a solvent selected from the group consisting of water, methanol, ethanol, isopropyl alcohol and mixtures thereof;
wherein the ratio of aldehyde resin to starch is from 7:5 to 5:1 by weight.

2. The composition of claim 1 wherein said aldehyde resin is selected from the group consisting of urea-formaldehyde resin, melamine-formaldehyde resin, phenol-formaldehyde resin, acetone-formaldehyde resin, phenol-acetaldehyde resin, urea-acetaldehyde resin, melamine-acetaldehyde resin, and acetone-acetaldehyde resin.

3. The composition of claim 1 wherein said curing agent is selected from the group consisting of aluminum chloride, aluminum sulfate, ammonium sulfate, ammonium chloride, maleic acid, maleic anhydride, sodium bisulfate, p-toluene sulfonic acid, formic acid and acetic acid.

4. The composition of claim 1 wherein said curing agent is aluminum chloride.

5. The composition of claim 1 wherein the starch is cornstarch.

6. The composition of claim 1 wherein the total solids content is in the range of from approximately 50 percent by weight to 80 percent by weight of the adhesive composition.

7. The composition of claim 1 wherein ther total solids content is approximately 60 percent by weight.

8. The composition of matter of claim 1 further comprising melamine.

9. A method of preparing an aldehyde resin and starch composition comprising:
(a) mixing starch and a solvent selected from the group consisting of water, methanol, ethanol, isopropyl alcohol and mixtures thereof;
(b) heating the starch and solvent mixture to a temperature sufficient to at least partially solubilize or disperse the starch; and
(c) adding to the starch and solvent mixture a mixture obtained from mixing starch and an aldehyde resin to thereby produce the aldehyde resin and starch composition.

10. The method of claim 8 wherein the total ratio of aldehyde resin to starch is from 7:5 to 5:1 on a weight basis.

11. The method of claim 9 wherein the aldehyde resin is urea-formaldehyde resin.

12. The method of claim 9 wherein the aldehyde resin is melamine-formaldehyde resin.

13. The method of claim 9 wherein the aldehyde resin is phenol-formaldehyde resin.

14. The method of claim 9 wherein the aldehyde resin is acetone-formaldehyde resin.

15. The method of claim 9 wherein the aldehyde resin is urea-acetaldehyde resin.

16. The method of claim 9 wherein the aldehyde resin is melamine-acetaldehyde resin.

17. The method of claim 9 wherein the aldehyde resin is phenol-acetaldehyde resin.

18. The method of claim 9 wherein the aldehyde resin is acetone-acetaldehyde resin.

19. The method of claim 9 wherein the starch and solvent mixture is heated in step (b) to a temperature in the range of approximately 40° to 80° C.

20. The method of claim 9 further comprising:
(d) adding to the aldehyde resin and starch composition of step (c) a curing agent selected from the group consisting of aluminum chloride, aluminum sulfate, ammonium sulfate, ammonium chloride, maleic acid, maleic anhydride, disodium bisulfate, p-toluene sulfonic acid, formic acid and acetic acid;
wherein the curing agent is present in an amount sufficient to accelerate the cure of the composition.

21. A method of preparing an aldehyde resin and starch composition comprising:
(a) mixing starch and a solvent selected from the group consisting of water, methanol, ethanol, isopropyl alcohol and mixtures thereof;
(b) adding to the starch and solvent mixture a mixture obtained from mixing starch and an aldehyde resin; and
(c) mixing to produce the aldehyde resin and starch composition.

22. The method of claim 21 wherein the total ratio of aldehyde resin to starch is from about 7:5 to about 5:1 on a weight basis.

23. The method of claim 21 wherein the aldehyde resin is urea-formaldehyde resin.

24. The method of claim 21 wherein the aldehyde resin is phenol-formaldehyde resin.

25. The method of claim 21 wherein the aldehyde resin is acetone-formaldehyde resin.

26. The method of claim 21 wherein the aldehyde resin is melamine-formaldehyde resin.

27. The method of claim 21 wherein the aldehyde resin is urea-acetaldehyde resin.

28. The method of claim 21 wherein the aldehyde resin is melamine-acetaldehyde resin.

29. The method of claim 21 wherein the aldehyde resin is phenol-acetaldehyde resin.

30. The method of claim 21 wherein the aldehyde resin is acetone-acetaldehyde resin.

31. The method of claim 21 further comprising:
(d) adding to the aldehyde resin and starch composition of step (c) a curing agent selected from the group consisting of aluminum chloride, aluminum sulfate, ammonium sulfate, ammonium chloride, maleic acid, maleic anhydride, disodium bisulfate, p-toluene sulfonic acid, formic acid and acetic acid;
wherein the curing agent is present in an amount sufficient to accelerate the cure of the composition.

32. A method of preparing corrugated paperboard comprising:
(a)
(1) mixing starch and a solvent selected from the group consisting of water, methanol, ethanol, isopropyl alcohol and mixtures thereof;
(2) heating the starch and solvent mixture of step (a)(1) to a temperature sufficient to disperse or at least partially solubilize the starch;
(3) adding to the starch and solvent mixture a mixture obtained from mixing starch and an aldehyde resin, wherein the resin and starch are present in a total ratio of from 7:5 to 5:1 by weight to thereby produce an aldehyde resin and starch composition; and
(4) adding to the composition or to a paperboard substrate or both a curing agent capable of reducing the pH of the composition, wherein said curing agent is present in an amount sufficient to accelerate the cure of the composition;
(b) applying the composition to at least one surface of the paperboard substrate, wherein the composition coats and impregnates said substrate;
(c) passing the coated and impregnated substrate to a corrugator wherein the substrate is exposed to temperature and pressure conditions sufficient to cure or partially cure the composition, whereby the substrate is corrugated.

33. A method as claimed in claim 32 wherein the temperature in step (c) is in the range of approximately 138° C. to 177° C.

34. A method as claimed in claim 32 further comprising:
(d) adhering at least one liner board to the corrugated substrate by means of an adhesive composition.

35. A method as claimed 34 wherein the adhesive composition used to adhere the liner board or boards to the corrugated substrate further comprises polyvinyl acetate.

36. A method as claimed in claim 34 wherein the adhesive composition used to adhere the liner board or boards to the corrugated substrate comprises:
(a) a starch-resin reaction product of a starch and an aldehyde resin, said product being formed by mixing said starch and said aldehyde resin;
(b) a curing agent capable of reducing the pH of the composition, wherein said curing agent is present in an amount sufficient to accelerate the cure of the composition; and
(c) a solvent;
wherein the ratio of aldehyde resin to starch is from 7:5 to 5:1 by weight.

37. A composition of matter which consists of a mixture of a starch and an aldehyde resin, said mixture being formed by mixing said starch and said aldehyde resin, wherein the ratio of aldehyde resin to starch is from about 7:5 to about 5:1 by weight.

38. The composition of matter of claim 37 further comprising a wax additive.

39. A method of increasing the hydrophobicity of the surface of a paperboard substrate which comprises coating the substrate with the composition of claim 38.

40. The method of claim 39 further comprising:
(a) adding to the composition or to the paperboard substrate or both a curing agent capable of reducing the pH of the composition, wherein said curing agent is present in an amount sufficient to accelerate the cure of the composition; and
(b) exposing the coated substrate to temperature and pressure conditions sufficient to cure or partially cure the composition.

41. A method of preparing paper cores or paper tubes comprising:
(a)
(1) mixing starch and a solvent selected from the group consisting of water, methanol, ethanol, isopropyl alcohol, and mixtures thereof;
(2) heating the starch and solvent mixture of step (a)(1) to a temperature sufficient to disperse or at least partially solubilize the starch;
(3) adding to the starch and solvent mixture a mixture obtained from mixing starch and an aldehyde resin, wherein the resin and starch are present in a total ratio of from 7:5 to about 5:1 by weight to thereby produce an aldehyde resin and starch composition; and
(4) adding to the composition a curing agent capable of reducing the pH of the composition, wherein said curing agent is present in an amount sufficient to accelerate the cure of the composition;
(b) applying the composition of step (a)(4) to at least one surface of a paperboard substrate, whereby the composition coats and impregnates said substrate;
(c) shaping the coated substrate of step (b) into a paper core or paper tube; and
(d) subjecting the paper core or paper tube to a temperature sufficient to remove the solvent, cure the composition, and thereby provide a reinforced paper core or paper tube.

42. The method of claim 41 wherein the aldehyde resin and starch composition of step (a)(3) further comprises one or more additives selected from the group consisting of sodium silicate, clay, poly vinyl acetate emulsion, dextrin, melamine, wax, silica, ground nut shells, silicone, acrylic emulsion, and styrene-butadiene rubber.

43. The method of claim 41 wherein the shaping technique of step (c) is selected from the group consisting of paper core spiral winding, paper tube spiral winding, paper core convolute winding, and paper tube convolute winding techniques.

* * * * *